(12) United States Patent
Yoshikawa

(10) Patent No.: US 6,199,150 B1
(45) Date of Patent: Mar. 6, 2001

(54) DATA MEMORY APPARATUS FORMING MEMORY MAP HAVING AREAS WITH DIFFERENT ACCESS SPEEDS

(75) Inventor: Takefumi Yoshikawa, Shiga-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/114,429

(22) Filed: Jul. 13, 1998

(30) Foreign Application Priority Data

Jul. 15, 1997 (JP) .................................................. 9-189398

(51) Int. Cl.[7] .................................................. G06F 12/06
(52) U.S. Cl. ............................................ 711/170; 713/100
(58) Field of Search .................................... 711/117, 147, 711/148, 153, 167, 170, 202; 710/60, 61, 128

(56) References Cited

U.S. PATENT DOCUMENTS

| | | | | |
|---|---|---|---|---|
| 5,509,138 | * | 4/1996 | Cash et al. | 711/170 |
| 5,634,042 | * | 5/1997 | Kashiwagi et al. | 713/501 |
| 5,652,856 | * | 7/1997 | Santeler et al. | 711/105 |
| 5,822,777 | * | 10/1998 | Leshem et al. | 711/167 |
| 5,935,232 | * | 8/1999 | Lambrecht et al. | 710/128 |
| 6,032,224 | * | 2/2000 | Blumenau | 711/117 |

FOREIGN PATENT DOCUMENTS

| | | |
|---|---|---|
| 03262055 | 11/1991 | (JP) . |
| 06110778 | 4/1994 | (JP) . |
| 06314359 | 11/1994 | (JP) . |
| 08095852 | 4/1996 | (JP) . |
| 08137513 | 5/1996 | (JP) . |

OTHER PUBLICATIONS

Japanese Language of Search Report; dated Nov. 18, 1998.
Office Action dated Apr. 12, 1999 for Japanese Application 10-194765.

* cited by examiner

Primary Examiner—Do Hyun Yoo
Assistant Examiner—Gary J. Portka
(74) Attorney, Agent, or Firm—Renner, Otto, Boisselle & Sklar LLP

(57) ABSTRACT

A data memory apparatus includes at least one memory device forming a memory map including at least a first memory area and a second memory area; and an access control unit for controlling access to the at least one memory device so that an access speed to the first memory area is different from an access speed to the second memory area.

8 Claims, 14 Drawing Sheets

DATA MEMORY APPARATUS FORMING MEMORY MAP HAVING AREAS WITH DIFFERENT ACCESS SPEEDS

BACKGROUND OF THE INVENTION

1. Field of the Invention

The present invention relates to a data memory apparatus including at least one memory device forming a memory map which includes a plurality of memory areas.

2. Description of the Related Art

FIG. 11 shows a structure of a conventional data memory apparatus 300. The data memory apparatus 300 includes memory devices 102, 104, 106, 108, 110, 112, 114 and 116 and a controller 140 for controlling the memory devices 102, 104, 106, 108, 110, 112, 114 and 116. The memory devices 102, 104, 106, 108, 110, 112, 114 and 116 and the controller 140 are connected to one another through a conductive line 120. Data is read from or written to the memory devices 102, 104, 106, 108, 110, 112, 114 and 116 by access from the controller 140.

The controller 140 in the data memory apparatus 300 is connected to a processor 130.

The data memory apparatus 300 having such a structure is in wide use for computers and consumer electronic appliances. The data memory apparatus 300 stores various data such as programs so that the processor 130 can execute any specified software.

FIG. 12 shows a structure of a memory map in the data memory apparatus 300. The memory map has a memory area of 9 megabytes (8 megabyte RAM area+1 megabyte VIDEO/ROM area). The VIDEO/ROM area is a memory area for VIDEO RAM and system ROM. The memory devices 102, 104, 106, 108, 110, 112, 114 and 116 are each assigned to a one-megabyte RAM area.

Recently, higher-speed and more complicated processing has been demanded by users. In order to comply with these demands, a large volume of data need be read from and written into the memory devices 102, 104, 106, 108, 110, 112, 114 and 116. Therefore, the data transfer speed required between the controller 140 (FIG. 11) and the memory devices 102, 104, 106, 108, 110, 112, 114 and 116 has been increased remarkably.

However, the controller 140 and the memory devices 102, 104, 106, 108, 110, 112, 114 and 116 are usually connected to each other on a PC substrate or a silicon substrate through conductive line 120 formed of copper or aluminum. When the signal frequency is increased to raise the data transfer speed, the signal is disrupted by reflections or the like generated at input ends of the controller 140 and the memory devices 102, 104, 106, 108, 110, 112, 114 and 116. In order to avoid such disturbance of the signal, conductive line 120 needs to be shortened as the signal frequency is increased.

When conductive line 120 is shortened, the number of memory devices which can be connected to conductive line 120 is reduced. As a result, memory capacity is reduced. This is contrary to the current demand for processing a large volume of data.

Among various types of processing demanded by the users, some types, such as image processing, are complicated and require frequent memory access; and some types, such as wordprocessing, are relatively simple and require less frequent memory access. However, conventionally, different types of data (including programs) which are accessed at significantly different frequencies (i.e., the number of times a type of data is accessed) are mapped uniformly in each area of the memory map. The structure shown in FIG. 12 is of such a conventional memory map which is flat in terms of speed.

One conventional method for increasing the memory access speed utilizes a cache memory 150 (FIG. 11), which is provided in the processor 130. By this method, however, a part of the data in the memory map, which is flat in terms of speed, is merely copied into the cache memory 150. When a cache hit miss occurs, the memory devices 102, 104, 106, 108, 110, 112, 114 and 116, which are equal in terms of speed, are accessed.

SUMMARY OF THE INVENTION

As used herein, the term "data" represents a concept including data and program.

A data memory apparatus according to the present invention includes at least one memory device forming a memory map including at least a first memory area and a second memory area; and an access control unit for controlling access to the at least one memory device so that an access speed to the first memory area is different from an access speed to the second memory area.

According to such a structure, the memory map can have a hierarchical structure in accordance with the access speed. Thus, the memory access can be optimized. For example, data required to be accessed at a high speed (for example, data accessed frequently) can be stored in a high-speed memory area; and data which can be accessed at a low speed (for example, data accessed less frequently) can be stored in a low-speed memory area. By optimizing the memory access in this manner, the performance of the entire system including the processor and the data memory apparatus is improved. Therefore, the memory capacity is increased without sacrificing the performance of the entire system.

In one embodiment of the invention, the memory map includes at least a high-speed memory device and a low-speed memory device. The memory device operates at a higher speed than the low-speed memory device. The high-speed memory device is assigned to the first memory area, and the low-speed memory device is assigned to the second memory area.

As a high-speed memory device, a high-speed and expensive memory (e.g., an SRAM) is used. As a low-speed memory device, a low-speed and inexpensive memory (e.g., a DRAM) is used. Thus, the memory devices forming the memory map can be optimized.

In one embodiment of the invention, the access control unit is connected to the high-speed memory device through a first bus and connected to the low-speed memory bus through a second bus.

In such a bus structure, data transferred at different speeds is not on the same bus. Thus, data conflict is avoided relatively easily, and control of data input and output is performed by the access control unit relatively easily.

In one embodiment of the invention, the access control unit includes a controller for inputting data to and outputting data from the first bus; and a transceiver for converting a transfer speed of data on the first bus and placing the data on the first bus onto the second bus at the converted transfer speed.

In such a structure, the controller is required to have only a port for the first bus. Therefore, any commercially available one-port controller is usable.

In one embodiment of the invention, the first bus is shorter than the second bus.

By setting the length of the first bus to be less than the length of the second bus, signal reflections which inadvantageously occurs at an input end of a high-speed memory device are restricted. By setting the length of the second bus to be greater than the length of the first bus, more memory devices can be connected to the second bus than to the first bus. Thus, memory capacity is increased.

In one embodiment of the invention, the transceiver includes a first-in-first-out buffer for storing the data on the first bus.

In such a structure, data on the first bus is stored in the first-in-first-out buffer temporarily. Therefore, the data on the first bus can be transferred at a high speed.

In one embodiment of the invention, the controller outputs a control signal to the transceiver, and the transceiver converts the transfer speed of the data on the first bus in accordance with the control signal.

In such a structure, the controller can control data input to and data output from the transceiver at desired timing. Thus, the utilization efficiency of both the first bus and the second bus is improved.

In one embodiment of the invention, the second bus is connected to a connector for providing an additional low-speed memory device.

In such a structure, an additional low-speed memory device can be provided by inserting a module card including a low-speed memory device into the connector. Since the connector is connected to the second bus, signal reflections and noise generated in, for example, the connector are restricted. As a result, erroneous data transfer is avoided.

In one embodiment of the invention, the data is stored in the memory map in accordance with an instruction from a user.

In such a structure, the data (a program) can be mapped to a high-speed memory area or a low-speed memory area in accordance with the request of the user. Thus, the memory map can be used so as to reflect the user's preference.

In one embodiment of the invention, the memory areas in the memory map are re-arranged in accordance with an instruction from a user.

In such a structure, one high-speed memory area is formed by combining two or more discrete high-speed memory areas. The high-speed memory area thus obtained allows data (a program) requiring a large capacity to be stored therein.

Thus, the invention described herein makes possible the advantage of providing a data memory apparatus which satisfies both a demand for higher speed processing and a demand for processing a larger volume of data, by solving the problems of the length of the conductive line and costs.

This and other advantages of the present invention will become apparent to those skilled in the art upon reading and understanding the following detailed description with reference to the accompanying figures.

DESCRIPTION OF THE PREFERRED EMBODIMENTS

The present invention will be described by way of illustrative examples with reference to the accompanying drawings.

Example 1

Figure 1:
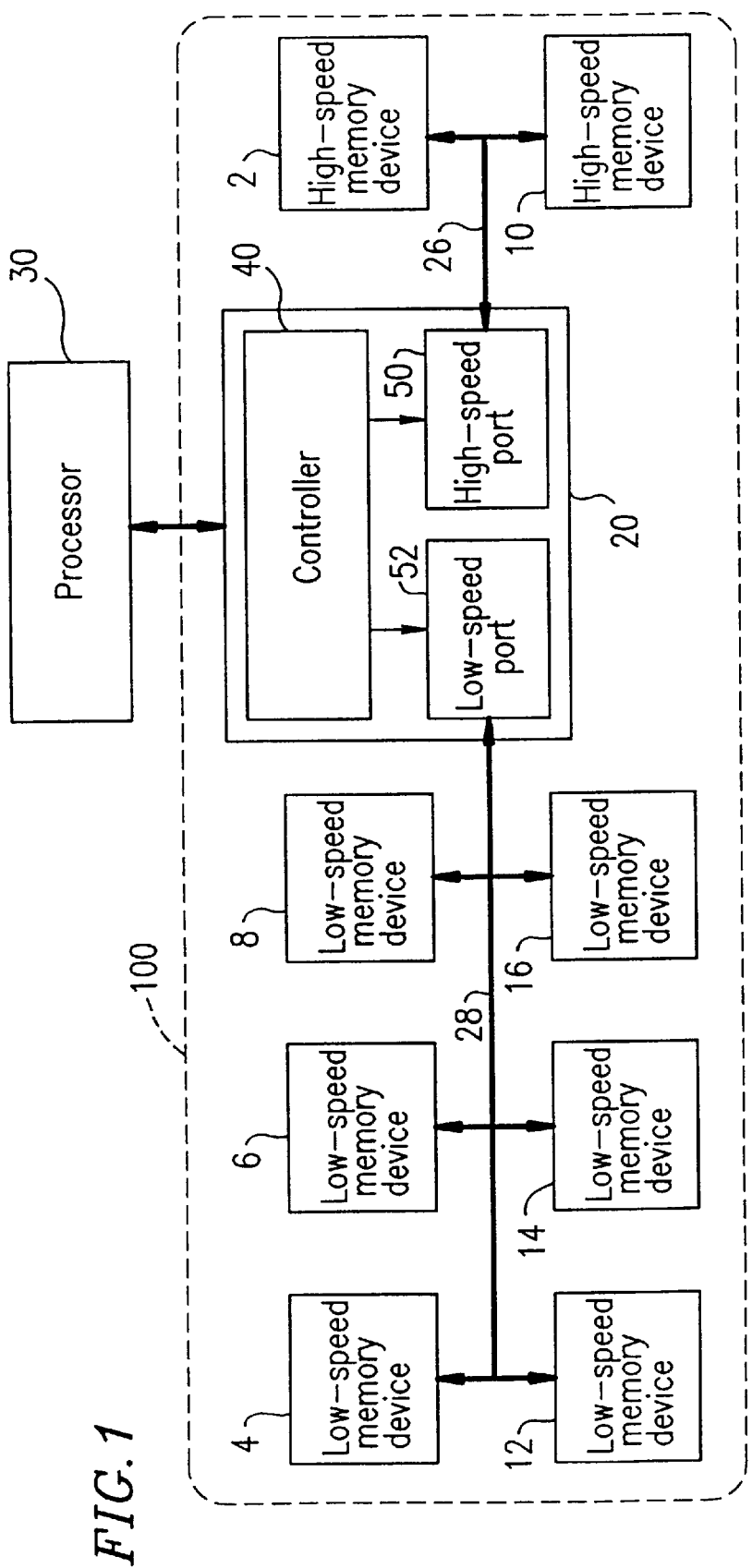
FIG. 1 is a block diagram of a data memory apparatus according to a first example of the present invention.

FIG. 1 shows a structure of a data memory apparatus 100 according to a first example of the present invention. The data memory apparatus 100 includes high-speed memory devices 2 and 10, and low-speed memory devices 4, 6, 8, 12, 14 and 16. The high-speed memory devices 2 and 10 operate at a higher speed than the low-speed memory devices 4, 6, 8, 12, 14 and 16. The high-speed memory devices 2 and 10 are, for example, SRAMs (static random access memories). The low-speed memory devices 4, 6, 8, 12, 14 and 16 are, for example, DRAMs (dynamic random access memories). A memory map of the data memory apparatus 100 is formed by the memory devices 2, 4, 6, 8, 10, 12, 14 and 16.

The data memory apparatus 100 further includes an access control unit 20 for controlling access to the high-speed memory device 2 and 10 and the low-speed memory devices 4, 6, 8, 12, 14 and 16. The access control unit 20 and the high-speed memory devices 2 and 10 are connected to one another through conductive line 26. The access control unit 20 and the low-speed memory devices 4, 6, 8, 12, 14 and 16 are connected to one another through conductive line 28.

Conductive line 26 is formed to have a length which is sufficiently short to avoid signal reflections at the input ends of the memory devices 2 and 10 when the memory devices 2 and 10 operate at a high speed. Conductive line 26 acts as a bus for high-speed memory devices (i.e., high-speed bus).

Conductive line 28 is formed to have a length which is longer than the length of conductive line 26, so that a larger number of memory devices can be connected to conductive line 28 than to conductive line 26. Conductive line 28 acts as a bus for low-speed memory devices (i.e., low-speed bus).

The access control unit 20 includes a controller 40 for inputting data to and outputting data from a processor 30 which is connected to the data memory apparatus 100, a high-speed port 50 for inputting data to and outputting data from conductive line 26 under the control of the controller 40, and a low-speed port 52 for inputting data to and outputting data from conductive line 28 under the control of the controller 40.

The controller 40 receives a logic address from the processor 30 and determines whether to access a high-speed memory device or a low-speed memory device by analyzing the logic address. In accordance with the determination result, the controller 40 drives the high-speed port 50 or the low-speed port 52. Thus, one of the memory devices 2, 4, 6, 8, 10, 12, 14 and 16 are accessed.

Figure 2:
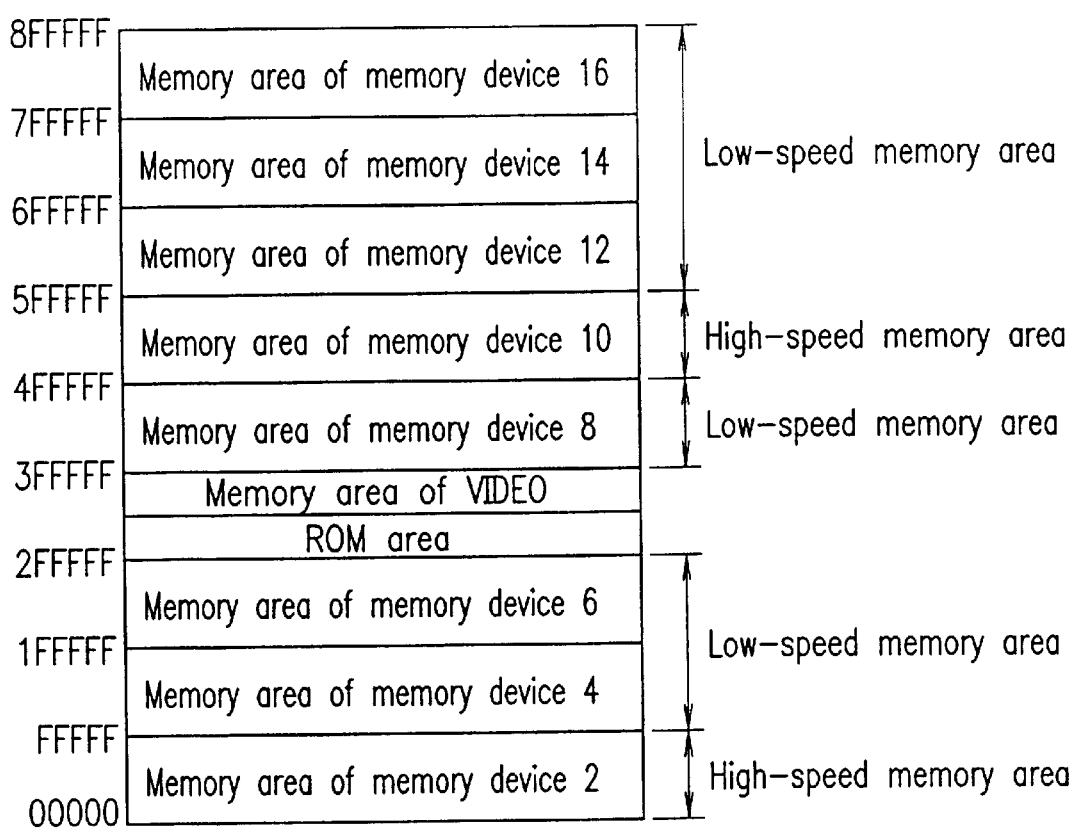
FIG. 2 shows a structure of a memory map of the data memory apparatus shown in FIG. 1.

FIG. 2 shows a structure of a memory map of a data memory apparatus 100. As shown in FIG. 2, the memory map is divided into at least a high-speed memory area and at least a low-speed memory area. The high-speed memory area is accessed by the high-speed memory device, and the low-speed memory area is accessed by the high-speed memory device.

In the example shown in FIG. 2, the high-speed memory devices 2 and 10 are assigned to the high-speed memory areas, and the low-speed memory devices 4, 6, 8, 12, 14 and 16 are assigned to the low-speed memory areas.

By providing the memory map with a hierarchical structure in accordance with the access speed, the memory access can be optimized. For example, data which is frequently accessed is stored in a high-speed memory area, and data which is accessed less frequently is stored in a low-speed memory area. Data which is frequently accessed includes, for example, data for operating systems and specific applications.

Referring back to FIG. 1, the access control unit 20 controls access to the memory devices 2, 4, 6, 8, 10, 12, 14 and 16 so that the access speed to the high-speed memory areas is different from the access speed to the low-speed memory areas. When the controller 40 loads a program (data) from the processor 30 to the data memory apparatus 100, the controller 40 determines whether the program (data) should be stored in a high-speed memory area or in a low-speed memory area. This is useful in improving the processing speed of the entire system including the processor 30 and the data memory apparatus 100. For example, even when a cache hit miss occurs, data to be processed at a high speed can be transmitted at a high speed from the high-speed memory device 2 or 10.

In the first example, the data memory apparatus 100 includes the memory devices 2, 4, 6, 8, 10, 12, 14 and 16, and the memory map includes a plurality of memory areas corresponding to the memory devices 2, 4, 6, 8, 10, 12, 14 and 16. Alternatively, a data memory apparatus can include a single memory device. In such a case, a memory map having a hierarchical structure in accordance with the access speeds is formed from a single memory device.

Figure 13:
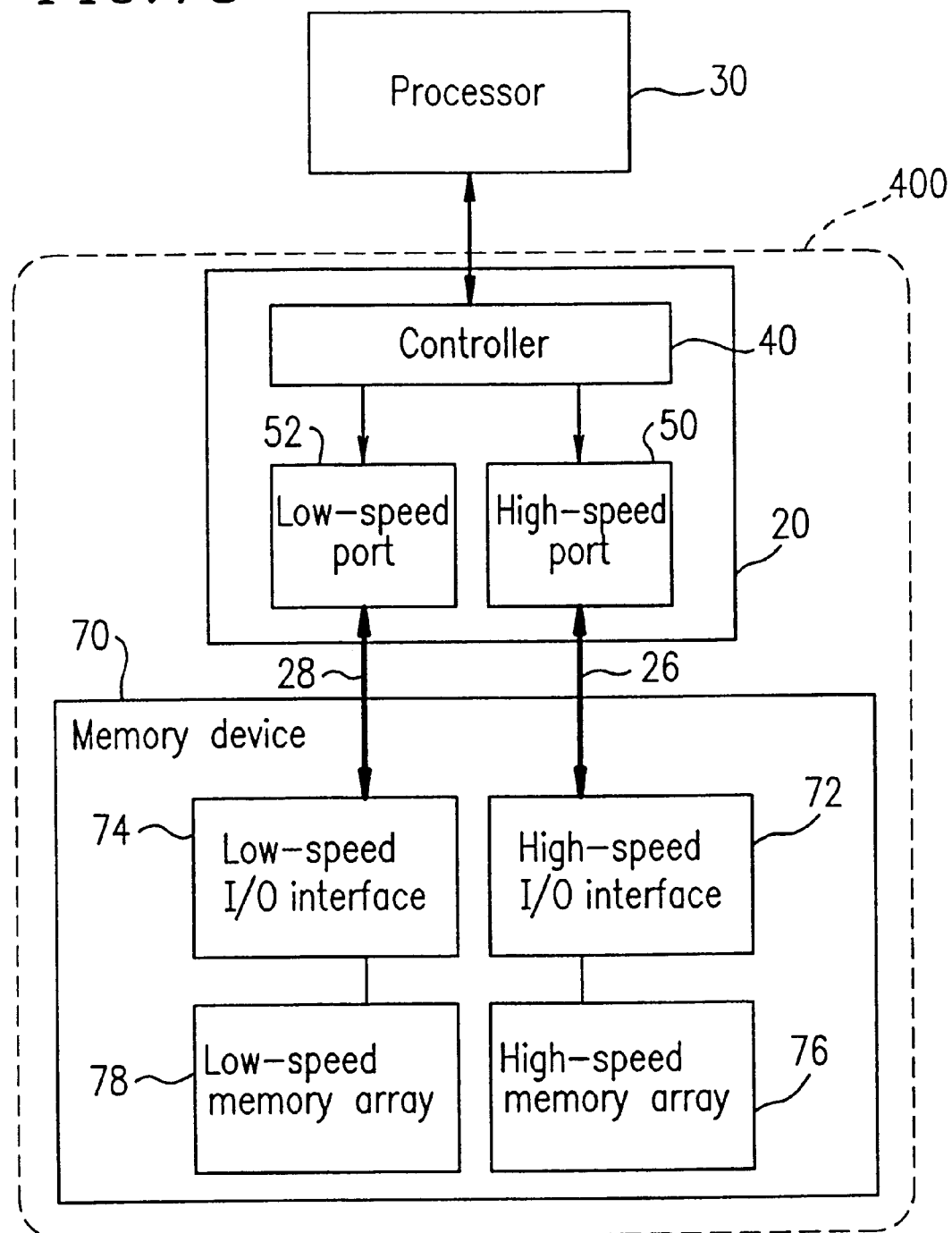
FIG. 13 shows a structure of a data memory apparatus, according to the present invention, including a single memory device.

FIG. 13 shows a structure of a data memory apparatus 400 including a single memory device 70. The memory device 70 includes a high-speed memory array 76 and a low-speed array 78. A memory map is formed of the high-speed memory array 76 and the low-speed array 78. As shown in FIG. 2, the memory map is divided into at least a high-speed memory area and at least a low-speed memory area. The high-speed memory array 76 is assigned to one or more high-speed memory areas, and the low-speed memory array 78 is assigned to one or more low-speed memory areas.

The access control unit 20 controls access to the high-speed memory array 76 and access to the low-speed memory array 78 so that the access speed to the high-speed memory area and the access speed to the low-speed memory area are different. Data input and output are performed between the high-speed port 50 and a high-speed I/O interface 72, which is connected to the high-speed memory array 76, through conductive line 26. Data input and output are performed between the low-speed port 52 and a low-speed I/O interface 74, which is connected to the low-speed memory array 78, through conductive line 28. The high-speed port 50 and the low-speed port 52 are controlled by the controller 40.

Thus, the memory map having a hierarchical structure in accordance with the access speeds is formed of the single memory device 70.

Figure 14:
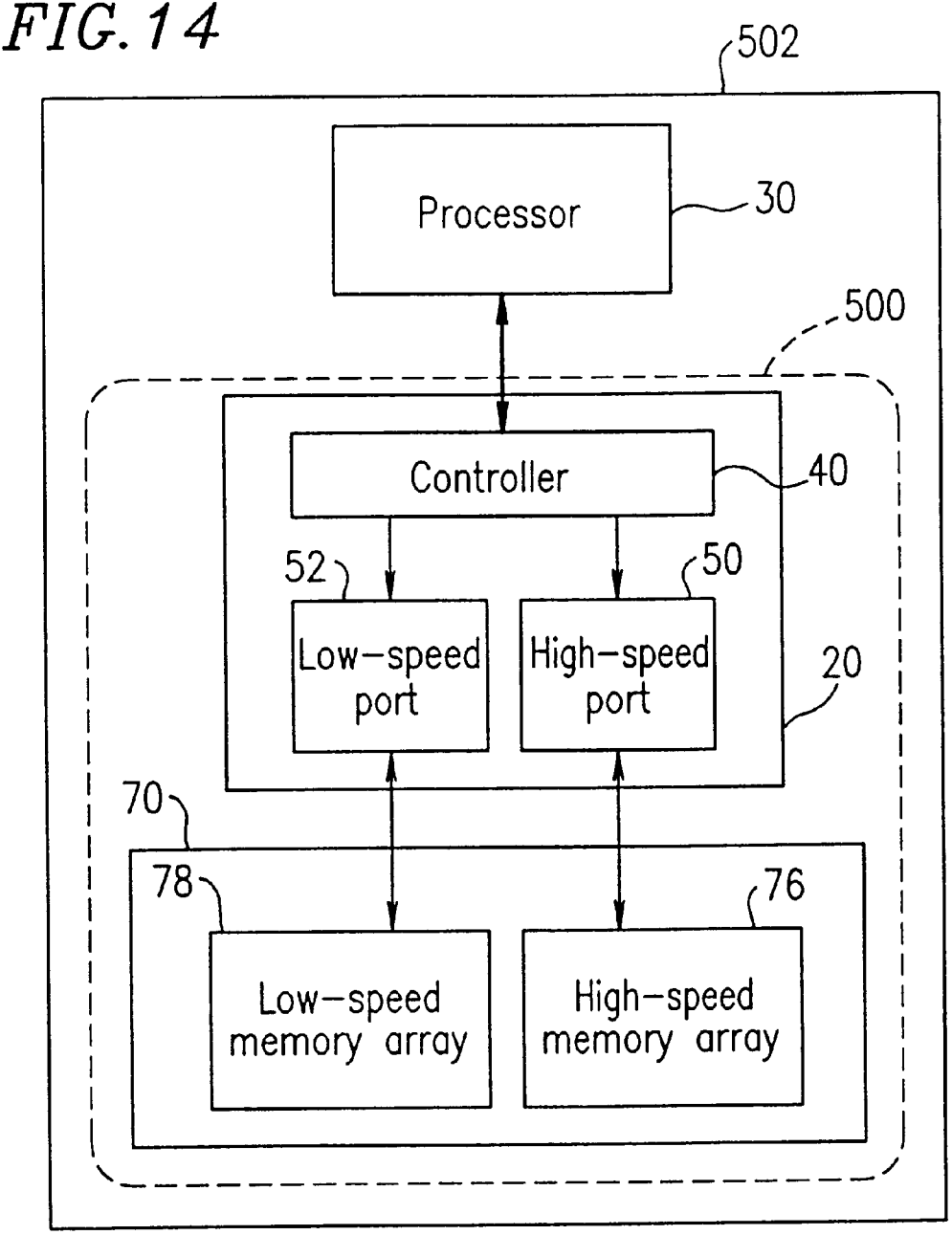
FIG. 14 shows a structure of another data memory apparatus, according to the present invention, including a single memory device.

FIG. 14 shows a structure of a data memory apparatus 500 including a single memory device 70. In the example shown in FIG. 14, the processor 30 and the data memory apparatus 500 are provided on a single semiconductor chip 502. In such a structure, the high-speed port 50 directly accesses the high-speed memory array 76, and the low-speed port 52 directly accesses the low-speed memory array 78. In this manner also, a memory map having a hierarchical structure in accordance with the access speeds is formed from a single memory device.

Example 2

Figure 3:
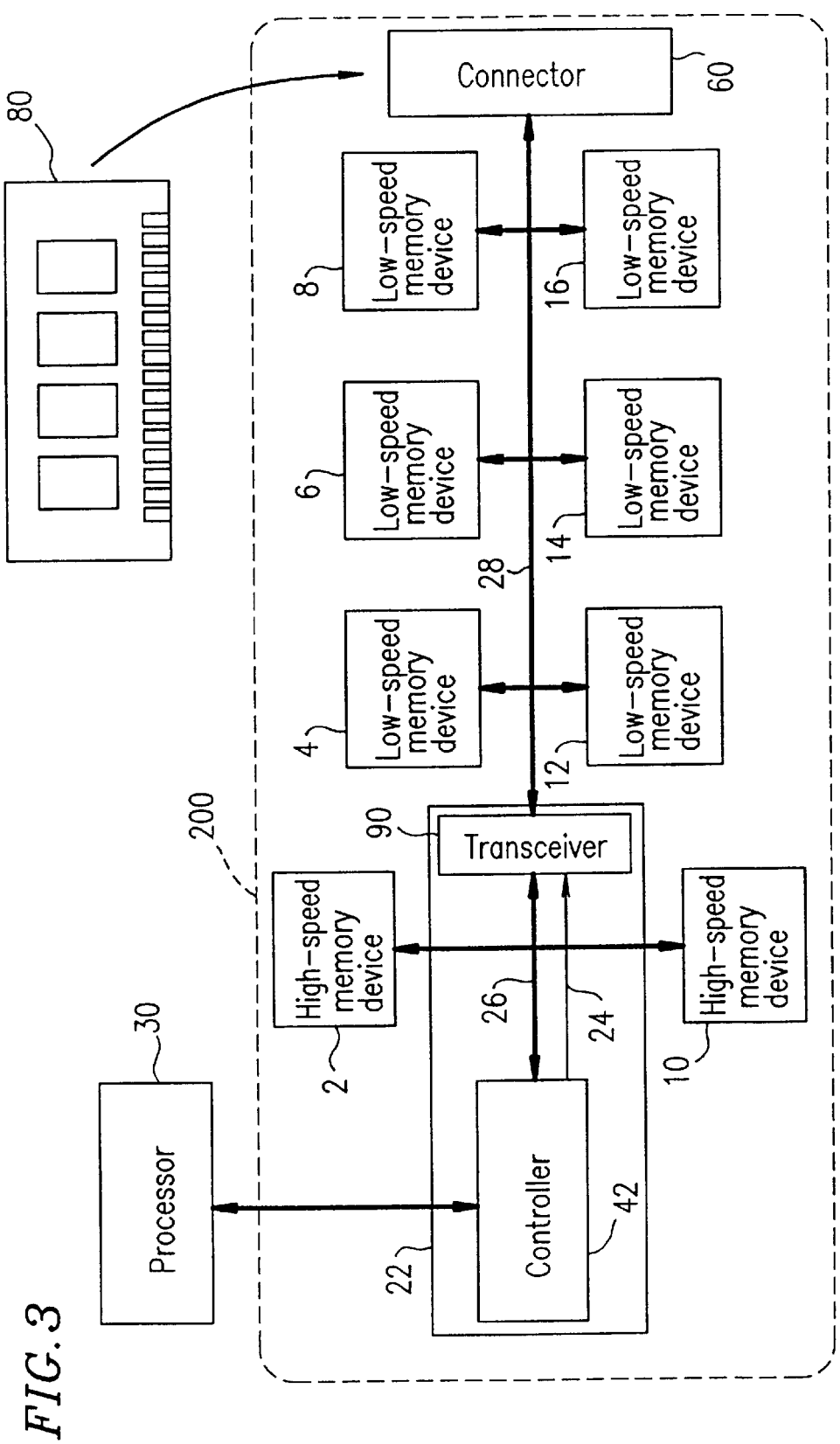
FIG. 3 is a block diagram of a data memory apparatus according to a second example of the present invention.

FIG. 3 shows a structure of a data memory apparatus 200 according to a second example of the present invention.

The data memory apparatus 200 includes high-speed memory devices 2 and 10, and low-speed memory devices 4, 6, 8, 12, 14 and 16. The high-speed memory device 2 and 10 operate at a higher speed than the low-speed memory devices 4, 6, 8, 12, 14 and 16.

The high-speed memory devices 2 and 10 are, for example, SRAMs. The low-speed memory devices 4, 6, 8, 12, 14 and 16 are, for example, DRAMs. A memory map is formed of the memory devices 2, 4, 6, 8, 10, 12, 14 and 16.

The data memory apparatus 200 further includes an access control unit 22 for controlling access to the high-speed memory device 2 and 10 and the low-speed memory devices 4, 6, 8, 12, 14 and 16. The access control unit 22 includes a controller 42 for inputting data to and outputting data from a processor 30, which is connected to the data memory apparatus 200, and a transceiver 90 for converting the data transfer speed.

The controller 42, the transceiver 90 and the high-speed memory devices 2 and 10 are connected to one another through conductive line 26. The transceiver 90 and the low-speed memory devices 4, 6, 8, 12, 14 and 16 are connected one another through conductive line 28.

Thus, a conductive line is divided into conductive lines 26 and 28 by the transceiver 90.

Conductive line 26 is provided closer to the controller 42 than conductive line 28. Conductive line 26 is formed to have a length which is sufficiently short to avoid signal reflections at the input ends of the memory devices 2 and 10 when the memory devices 2 and 10 operate at a high speed. Thus, the signal reflections and noise can be restricted. As a result, the data transfer speed through conductive line 26 is improved up to 200 MHz.

Conductive line 28 is provided farther from the controller 42 than conductive line 26. Conductive line 28 is formed to have a length which is longer than the length of conductive line 26. Six low-speed memory devices 4, 6, 8, 12, 14 and 16 are connected to conductive line 28. The data transfer speed through conductive line 28 is improved only to 100

MHz due to the signal reflections and noise. However, the amount of data which can be transferred by conductive line 28 is three times larger than the amount of data which can be transferred by conductive line 26.

Conductive line 26 is connected to a connector 60 in order to allow for the provision of at least one low-speed memory device. The memory capacity of the data memory apparatus 200 is increased by inserting a module card 80 including at least one low-speed memory device into the connecter 60.

Figure 4:
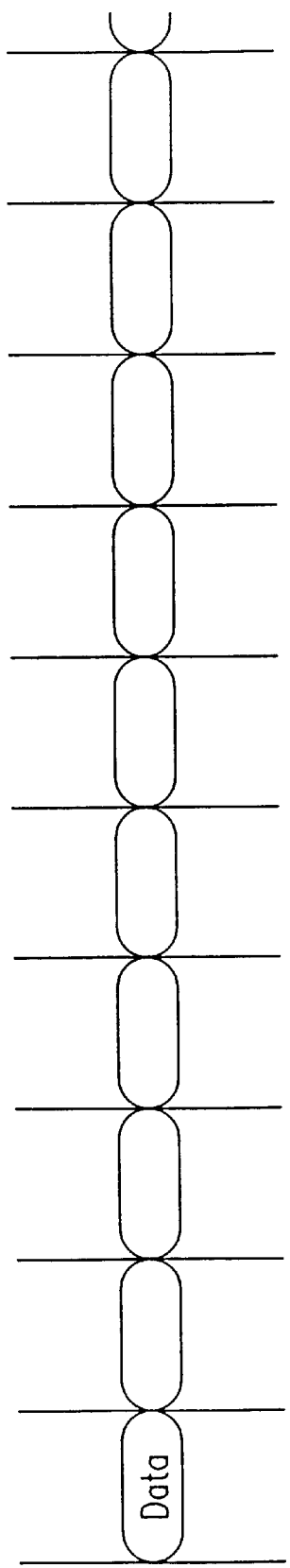
FIG. 4 is a diagram showing a data transfer cycle on one of two conductive lines when data is transferred to high-speed memory areas.

FIG. 4 shows a data transfer cycle through conductive line 26 in the case where the data is transferred to the high-speed memory areas. Since the data transfer speed is 200 MHz when the data is transferred to the high-speed memory areas, the high-speed memory devices 2 and 10 are accessed at a speed of 200 MHz. When the high-speed memory devices 2 and 10 are accessed, the data does not pass through the transceiver 90.

Figure 5:
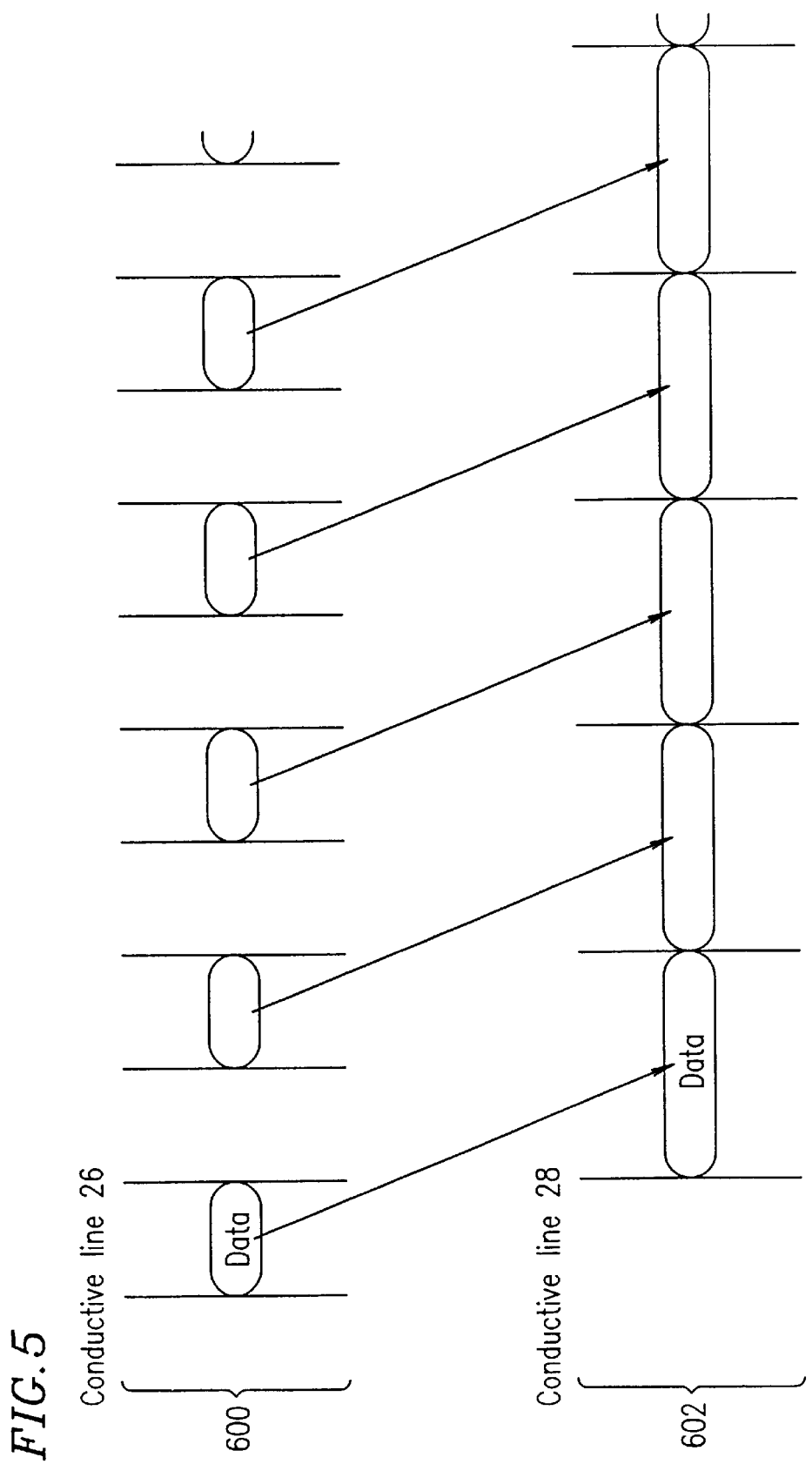
FIG. 5 is a diagram showing a data transfer cycle on both the conductive lines when data is transferred to low-speed memory areas.

FIG. 5 shows data transfer cycles in the case where the data is transferred to the low-speed memory areas. Section 600 shows the data transfer cycle through conductive line 26. The data on conductive line 26 is intermittently transferred so that the data transfer speed is equivalent to 100 MHz.

Section 602 of FIG. 5 shows the data transfer cycle through conductive line 28. The data on conductive line 28 is continuously transferred at a speed of 100 MHz. Accordingly, the low-speed memory devices 4, 6, 8, 12, 14 and 16 connected to conductive line 28 are accessed at a speed of 100 MHz.

The transceiver 90 converts the data transfer cycle through conductive line 26 (section 600) into the data transfer cycle through conductive line 28 (section 602). Thus, the transceiver 90 converts a transfer speed of the data on conductive line 26 and places the data on conductive line 26 onto conductive line 28 at the converted transfer speed. In order to transfer data from conductive line 28 to conductive line 26, the transceiver 90 performs an opposite conversion from the conversion described above.

The direction of the data transfer between conductive lines 26 and 28, the wait time for data transfer between conductive lines 26 and 28, and other parameters are controlled by a control signal 24 (FIG. 3) which is supplied from the controller 42 to the transceiver 90.

The controller 42 controls the transceiver 90 using the control signal 24, so that the data is efficiently transferred by conductive lines 26 and 28. As a result, the performance of the entire system is improved. The controller 42 can prevent conflict between data to be written into the memory devices and data read from the memory devices, using the control signal 24.

The data memory apparatus 200 has the memory map shown in FIG. 2. By providing the memory map with a hierarchical structure in accordance with the access speed, the memory access can be optimized.

Figure 6:
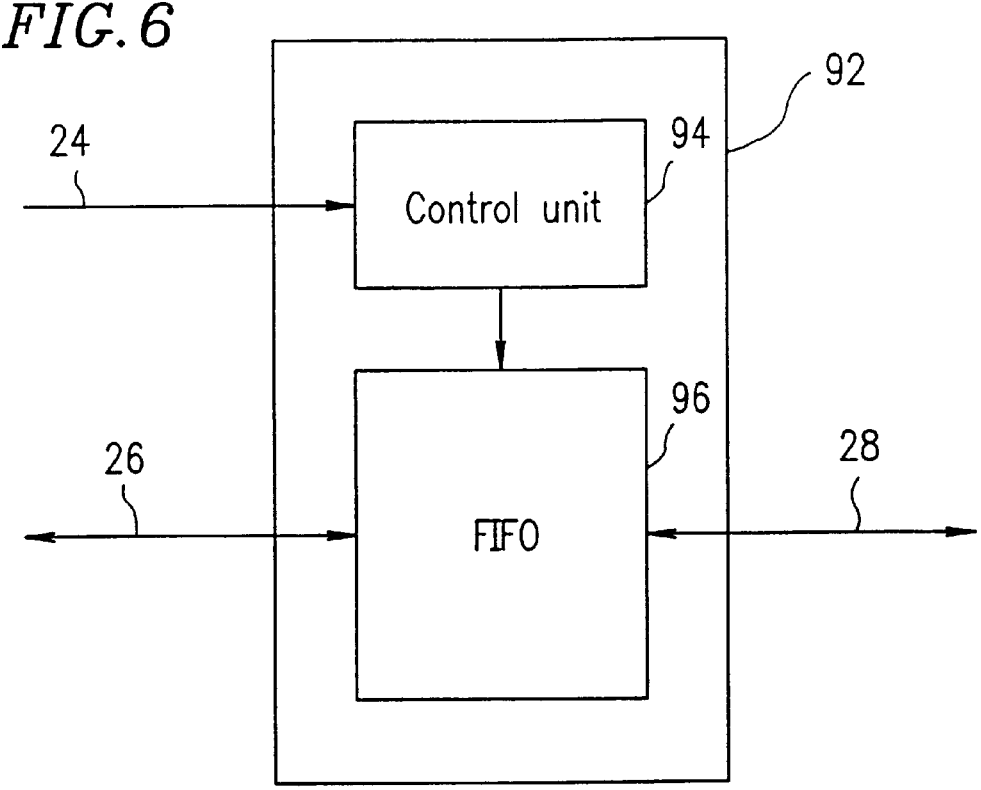
FIG. 6 shows a structure of a transceiver usable in the data memory apparatus shown in FIG. 3.

FIG. 6 shows a structure of a transceiver 92 which is usable in the data memory apparatus 200 in place of the transceiver 90. The transceiver 92 includes a control unit 94 for receiving the control signal 24 and a first-in-first-out (FIFO) buffer 96. The operation of the FIFO buffer 96 is controlled by the control unit 94.

By providing the FIFO buffer 96 in the transceiver 92, data on conductive line 26 is sequentially stored in the FIFO buffer 96. Thus, the data on conductive line 26 is allowed to be continuously transferred to the FIFO buffer 96 at a speed of 200 MHz. The data stored in the FIFO buffer 96 is continuously transferred to conductive line 28 at a speed of 100 MHz.

Figure 7:
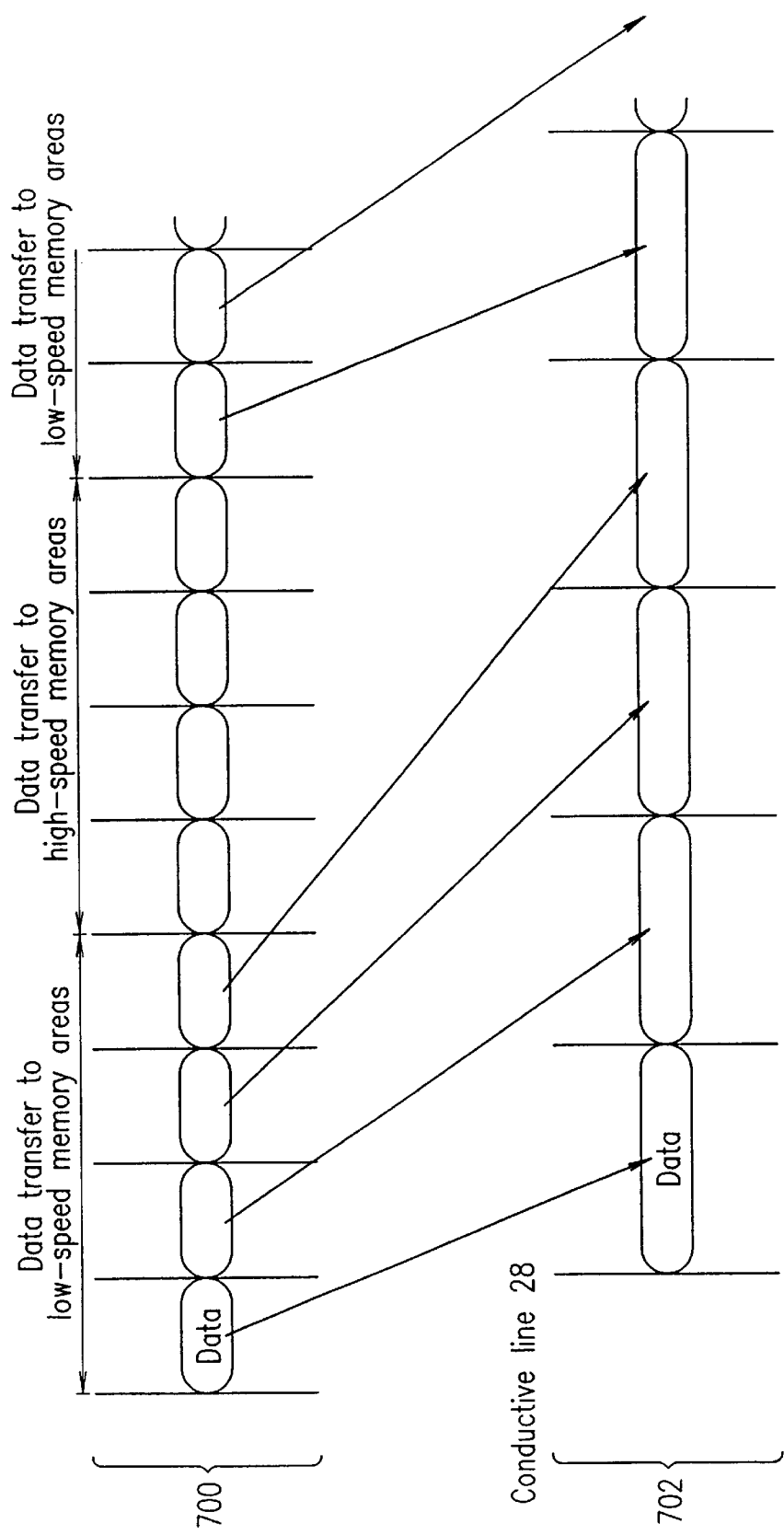
FIG. 7 is a diagram showing a data transfer cycle on both the conductive lines when data is transferred to low-speed memory areas in the case where the transceiver has the structure shown in FIG. 6.

FIG. 7 shows data transfer cycles in the case where the data is transferred to the low-speed memory areas when the transceiver 92 including the FIFO buffer 96 is used. Section 700 shows the data transfer cycle through conductive line 26. The data on conductive line 26 is continuously transferred at a speed of 200 MHz.

Section 702 of FIG. 7 shows the data transfer cycle through conductive line 28. The data on conductive line 28 is continuously transferred at a speed of 100 MHz.

The transceiver 92 (FIG. 6) converts the data transfer cycle through conductive line 26 (section 700) into the data transfer cycle through conductive line 28 (section 702). Thus, the transceiver 92 converts a transfer speed of data on conductive line 26 and places the data on conductive line 26 onto conductive line 28 at the converted transfer speed. In order to transfer data from conductive line 28 to conductive line 26, the transceiver 92 performs an opposite conversion from the conversion described above.

By providing the FIFO buffer 96 in the transceiver 92, the data on conductive line 26 is transferred continuously at a speed of 200 MHz regardless of whether the data is transferred to the high-speed memory area or the low-speed memory area. Thus, efficient data transfer is realized.

As described above, the data memory device 200 (FIG. 3) in the second example includes a memory map including high-speed memory areas and low-speed memory areas. Such a memory map has a hierarchical structure in accordance with the access speed. The memory area in which the data (including programs) is to be loaded is determined at the hardware level by the processor 30 or the controller 42. Alternatively, the user can instruct the memory area in which the data (including programs) is to be loaded, using a window menu. The window menu is displayed on a screen of a display device (not shown) connected to the processor 30. The instruction from the user is input to the processor 30 through an input device (not shown) such as a keyboard or a mouse.

Figure 8:
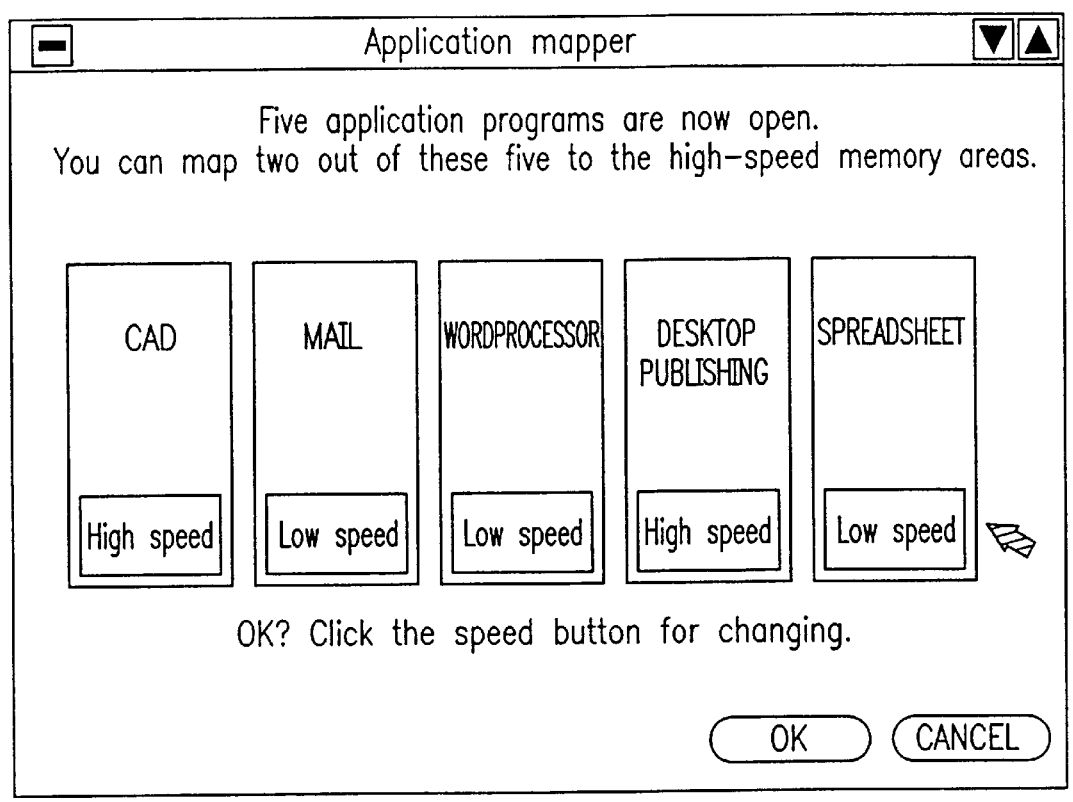
FIG. 8 shows an exemplary window menu.

FIG. 8 shows an exemplary window menu. In the example shown in FIG. 8, five application programs, i.e., "CAD", "MAIL", "WORDPROCESSOR", "DESKTOP PUBLISHING" and "SPREADSHEET" are initiated. Among the five applications, "CAD" and "DESKTOP PUBLISHING" are assigned to the high-speed memory areas and the remaining three application programs are assigned to the low-speed memory areas.

The assignment of the application programs is changed by, for example, clicking a speed button in the window menu. Clicking a "high speed" button changes the assignment of the corresponding application program from the high-speed memory area to the low-speed memory area. As a result, a "low speed" button is displayed in place of the "high speed" button. Clicking a "low speed" button changes the assignment of the corresponding application program from the low-speed memory area to the high-speed memory area. As a result, a "high speed" button is displayed in place of the "low speed" button.

The user specifies the memory area in which the program is to be loaded in accordance with the frequency of use of each program, the capacity required for executing the program, user's preference and the like.

Figure 9:
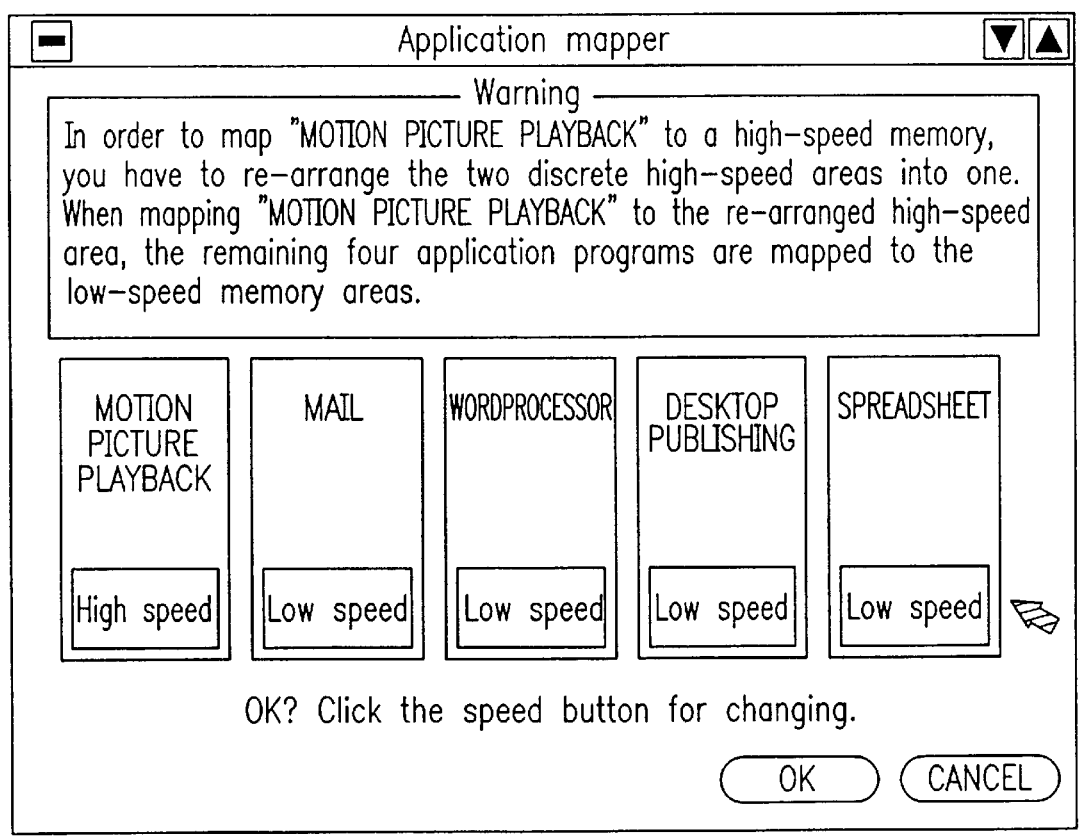
FIG. 9 shows another exemplary window menu.

FIG. 9 shows another exemplary window menu. In the case of initiating a program requiring a large memory area, such as a "MOTION PICTURE PLAYBACK" application program, the application program cannot be assigned to two discrete high-speed memory areas. In such a case, the two discrete high-speed memory areas need be re-mapped into one high-speed area. Such re-mapping is executed in accordance with an instruction from the user.

Figure 10:
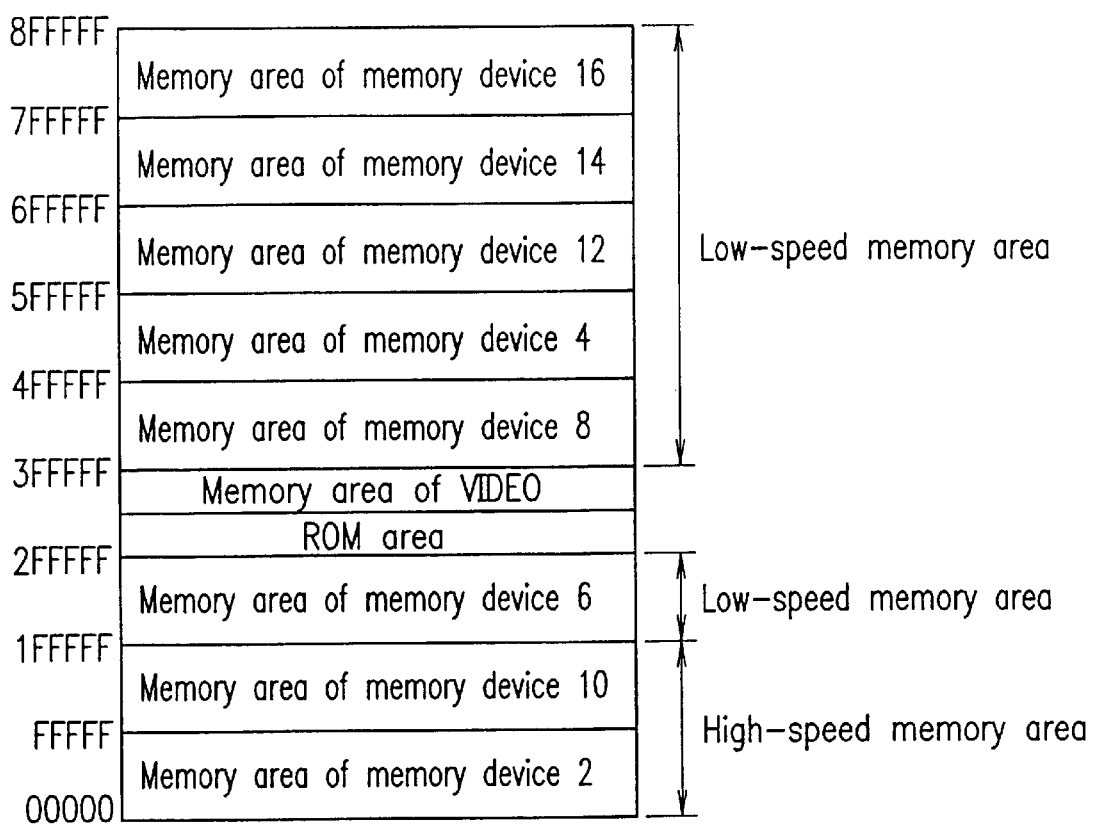
FIG. 10 shows a structure of a memory map in the data memory apparatus shown in FIG. 3, which is re-mapped at the instruction of the user.
Figure 11:
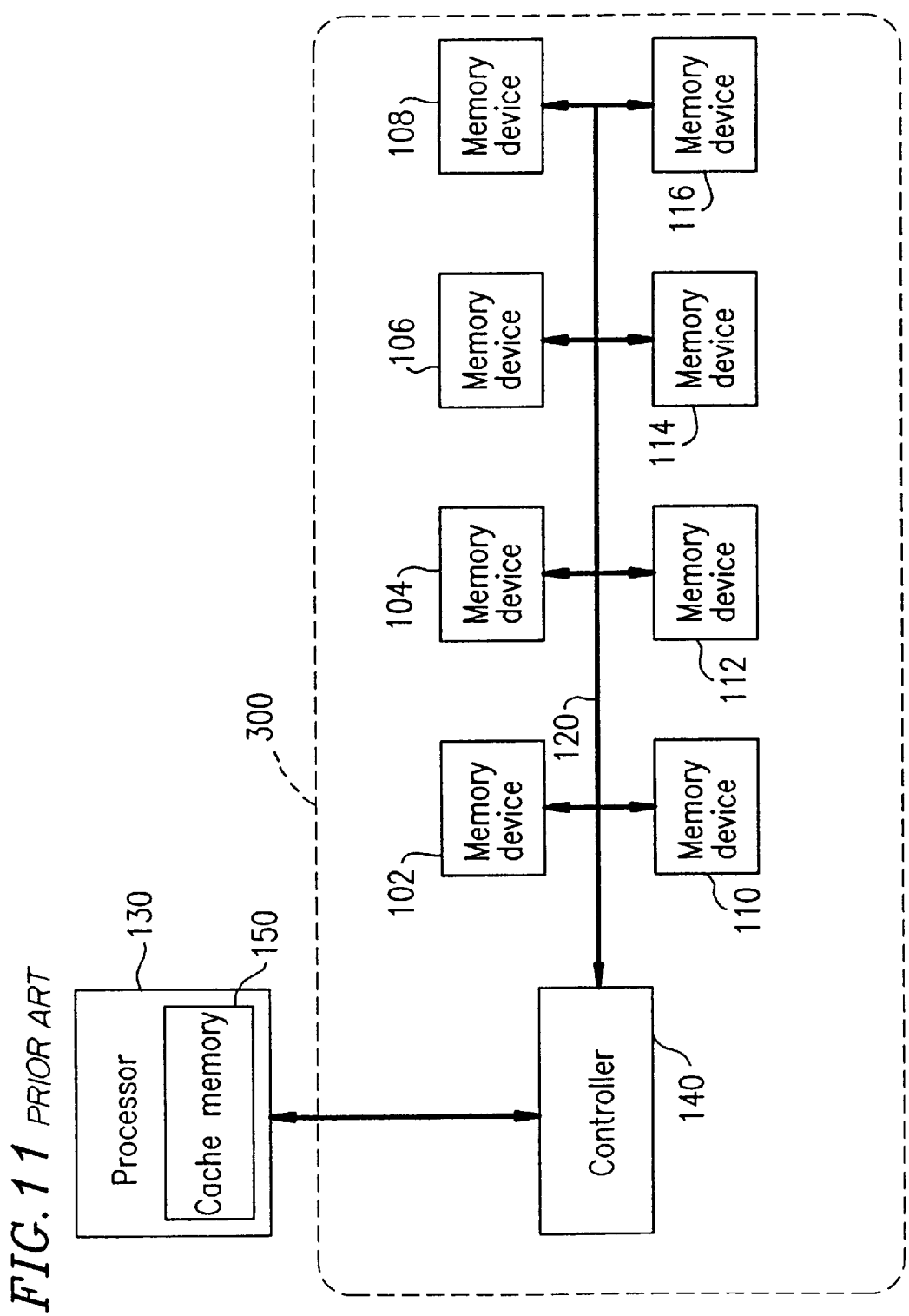
FIG. 11 is a block diagram of a conventional data memory apparatus.
Figure 12:
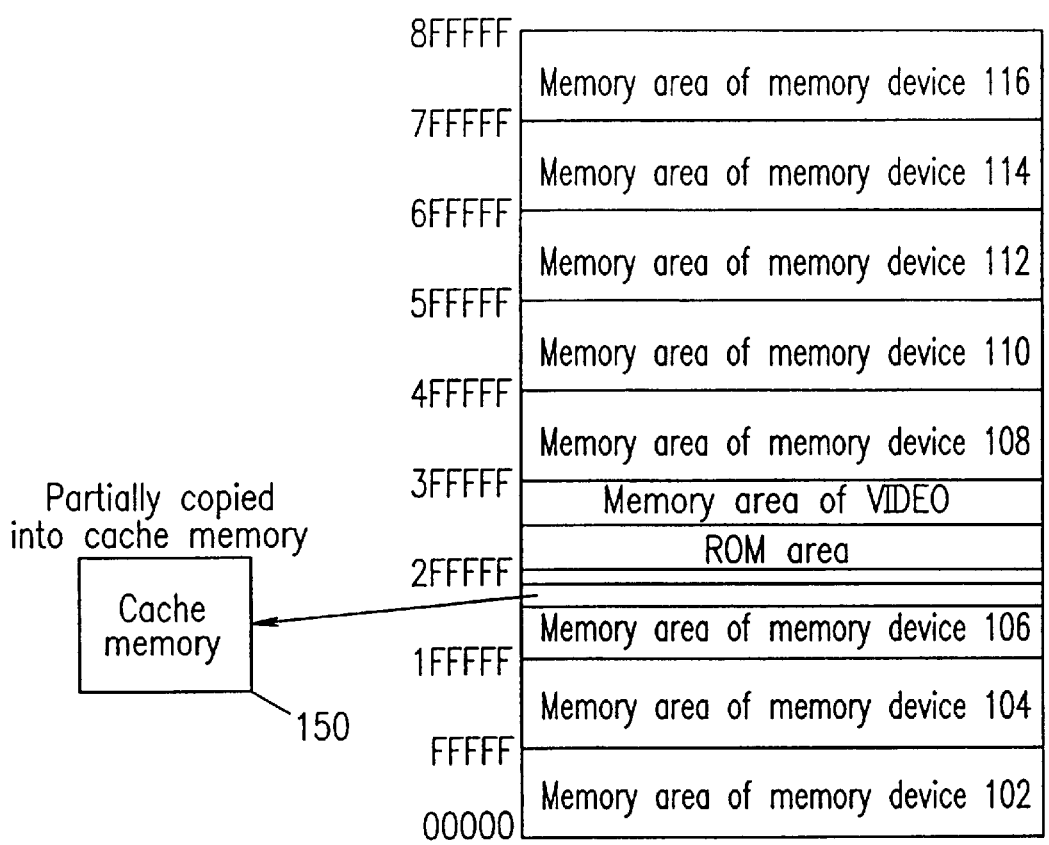
FIG. 12 shows a structure of a memory map of the conventional data memory apparatus shown in FIG. 11.

FIG. 10 shows a structure of a memory map formed as a result of re-mapping performed in accordance with the instruction from the user. As shown in FIG. 10, the memory areas of the high-speed memory devices 2 and 10 are re-arranged into one memory area. Such re-mapping is executed by the controller 42.

Thus, the memory map is arranged so as to comply with the request of the user by user interface at both software and hardware levels.

In the second example, the data memory apparatus 200 includes the memory devices 2, 4, 6, 8, 10, 12, 14 and 16, and the memory map includes a plurality of memory areas corresponding to the memory devices 2, 4, 6, 8, 10, 12, 14 and 16. Alternatively, the data memory apparatus 200 can include a single memory device. In such a case, the memory map is provided with a hierarchical structure in accordance with the access speeds in the same manner as described in the first example.

According to the present invention, a data memory apparatus including a memory map having a hierarchical structure in accordance with the access speed is provided without reducing the memory capacity. Thus, the memory access is optimized. As a result, the processing efficiency of the entire system is improved. Computers and consumer appliances incorporating a data memory apparatus according to the present invention will have enhanced values as products.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data memory apparatus, comprising:

at least one high-speed memory device and at least one low-speed memory device forming a memory map including at least a first memory area to which the at least one high-speed memory device is assigned and a second memory area to which the at least one low-speed memory device is assigned;

an access control unit for controlling access to the at least one high-speed memory device and the at least one low-speed memory device;

a high-speed bus which provides high speed data transfer between the at least one high-speed memory device and the access control unit, the high-speed bus being relatively short in length and located in relatively close physical proximity to the access control unit;

a low-speed bus which provides low speed data transfer between the at least one low-speed memory device and the access control unit, the low-speed bus being relatively long in length and located in relatively remote physical proximity to the access control unit;

whereby an access speed to the first memory area is faster than an access speed to the second memory area.

2. A data memory apparatus according to claim 1, wherein the access control unit includes:

a controller for inputting data to and outputting data from the high speed bus; and a transceiver for converting a transfer speed of data on the high-speed bus and placing the data on the high-speed bus onto the low-speed bus at the converted transfer speed.

3. A data memory apparatus according to claim 1, wherein the high-speed bus is shorter than the low-speed bus.

4. A data memory apparatus according to claim 2 wherein the transceiver includes a first-in-first-out buffer for storing the data on the high-speed bus.

5. A data memory apparatus according to claim 2, wherein the controller outputs a control signal to the transceiver, and the transceiver converts the transfer speed of the data on the high-speed bus in accordance with the control signal.

6. A data memory apparatus according to claim 1, wherein the low-speed bus is connected to a connector for providing an additional low-speed memory device.

7. A data memory apparatus according to claim 1, wherein the data is stored in the memory map in accordance with an instruction from a user.

8. A data memory apparatus according to claim 1, wherein the memory areas in the memory map are re-arranged in accordance with an instruction from a user.

* * * * *